(No Model.)
J. M. YOUNG.
HANDLE FOR MANURE FORKS AND ANALOGOUS TOOLS.
No. 252,167. Patented Jan. 10, 1882.
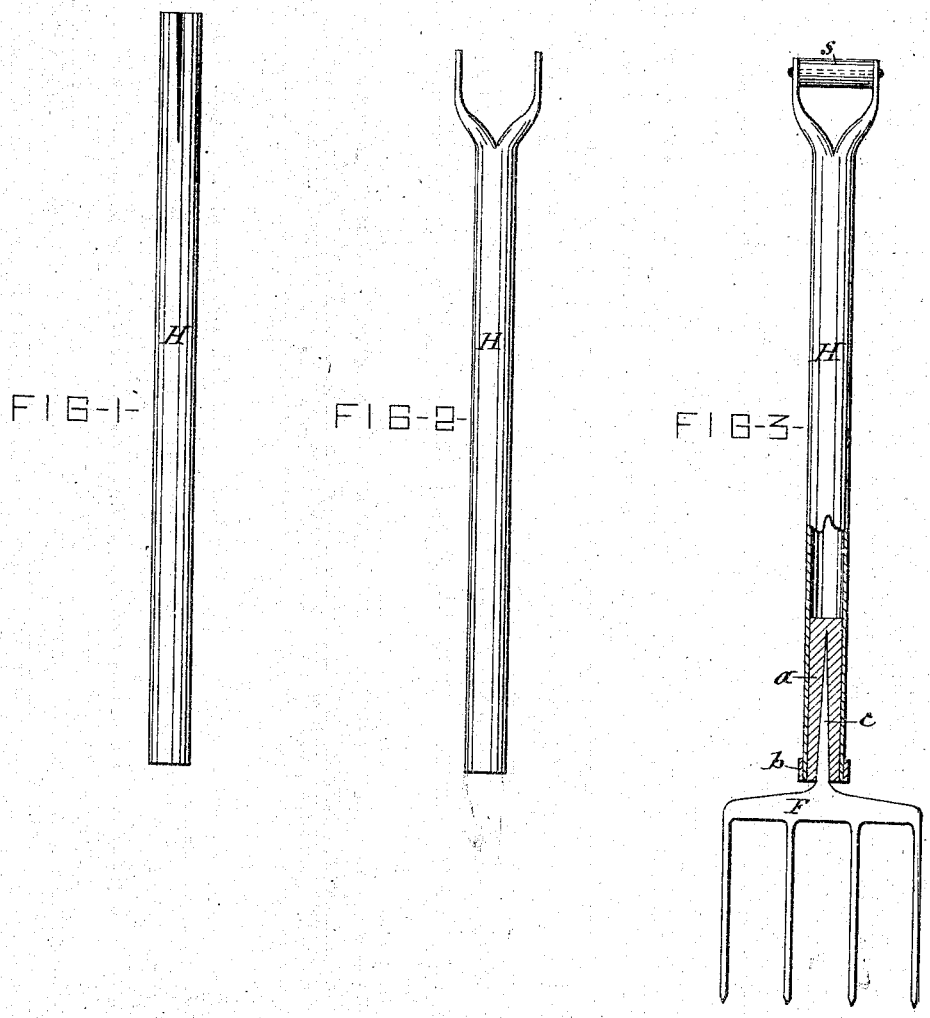

UNITED STATES PATENT OFFICE.

JOHN M. YOUNG, OF BALDWINSVILLE, NEW YORK.

HANDLE FOR MANURE-FORKS AND ANALOGOUS TOOLS.

SPECIFICATION forming part of Letters Patent No. 252,167, dated January 10, 1882.

Application filed August 4, 1881. (No model.)

*To all whom it may concern:*

Be it known that I, JOHN M. YOUNG, of Baldwinsville, in the county of Onondaga, in the State of New York, have invented new and useful Improvements in Handles for Manure-Forks and Analogous Tools, of which the following, taken in connection with the accompanying drawings, is a full, clear, and exact description.

This invention relates to that class of handles in which the stem is composed of metal tubing; and it consists in improved means of providing said stem with the so-called "D-handle," all as hereinafter more fully explained.

The invention is fully illustrated in the annexed drawings, wherein Figure 1 shows a piece of metal tubing from which my improved handle is formed. Fig. 2 is a view of the same with its upper or free end distended to receive the usual cross-piece or spool and form the so-called "D-end;" and Fig. 3 shows the handle complete, with the exception of a portion of one side broken away to illustrate the attachment of the handle to the tool.

Similar letters of reference indicate corresponding parts.

H denotes the handle of a manure-fork or other similar tool. Said handle is composed of a piece of wrought-metal tubing of the requisite length and bent into the usual form. The interior of the lower end of this handle I maintain in its original cylindrical form of uniform diameter, and into this I drive a wooden plug or bush, $a$, which is also cylindrical, and made to press with its entire length against the interior of the handle, and thus obtain a firm hold in the same. If necessary, I re-enforce the said end of the handle by applying to the exterior thereof a ferrule, $b$.

The fork F, I provide with a shank or tang, C, which I drive into the wooden bush $a$, and thereby attach the handle H to said fork.

The upper or free end of the handle H, I split longitudinally into two parts, and then spread the divided parts asunder and bend them into the requisite shape to receive between their extremities the spool $s$ or other cross-piece, which I secure in the usual way by a rod passing through the spool and through the divided ends of the handle, thus forming a strong and durable handle by simple and comparatively inexpensive means.

Having described my invention, what I claim as new, and desire to secure by Letters Patent, is—

The handle H, composed of metal tubing, and having its upper end split longitudinally and distended, as shown, for the purpose of receiving between its extremities the spool $s$ or other cross-piece, substantially as shown and set forth.

In testimony whereof I have hereunto signed my name and affixed my seal, in the presence of two attesting witnesses, at Syracuse, in the county of Onondaga, in the State of New York, this 29th day of July, 1881.

JOHN M. YOUNG. [L. S.]

Witnesses:
 W. L. FRAZER,
 WM. C. RAYMOND.